(12) United States Patent
Vesel

(10) Patent No.: US 7,383,124 B1
(45) Date of Patent: Jun. 3, 2008

(54) ADS-B BROADCAST MONITORING SYSTEM AND METHOD

(75) Inventor: Andrew W. Vesel, Indialantic, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 791 days.

(21) Appl. No.: 10/864,097

(22) Filed: Jun. 9, 2004

(51) Int. Cl.
*G01C 21/00* (2006.01)

(52) U.S. Cl. .................... 701/200; 701/9; 701/13; 340/945

(58) Field of Classification Search .............. 701/3, 701/4, 9, 13, 29, 200, 301; 340/903, 906–907, 340/945; 455/73
See application file for complete search history.

(56) References Cited

U.S. PATENT DOCUMENTS

| | | | |
|---|---|---|---|
| 6,085,150 A | 7/2000 | Henry et al. | 701/301 |
| 6,169,770 B1 | 1/2001 | Henely | 375/317 |
| 6,240,345 B1 | 5/2001 | Vesel | 701/31 |
| 6,694,249 B1 | 2/2004 | Anderson et al. | 701/120 |
| 6,792,058 B1 * | 9/2004 | Hershey et al. | 375/347 |
| 2002/0169533 A1 * | 11/2002 | Browne et al. | 701/45 |

* cited by examiner

*Primary Examiner*—Gertrude Arthur Jeangla
(74) *Attorney, Agent, or Firm*—Nathan O. Jensen; Kyle Eppele

(57) ABSTRACT

A vehicle having a first transponder circuit generating an over-the-air transmission signal and a reference signal is disclosed. The vehicle also has a receiver circuit that receives the over-the-air transmission signal. The vehicle also has an integrity-checking circuit receiving an integrity signal from the receiver circuit. The integrity signal is based on the over-the-air transmission signal received by the receiver. The integrity-checking circuit also receives the reference signal from the first transponder circuit. The integrity-checking circuit determines the integrity of the over-the-air transmission signal.

20 Claims, 2 Drawing Sheets

FIG. 1

ADS-B BROADCAST MONITORING SYSTEM AND METHOD

BACKGROUND

Conventionally, avionics engineers and certification bodies are improving and providing pilots and flight crews with information necessary to identify in-flight traffic. An approach has been to provide the flight crew with information on the location of other aircraft in the area. One exemplary system which is capable of providing this information, is known as a traffic alert and collision avoidance system (TCAS). TCAS systems are required for all airliners flying in the United States air space today. TCAS devices have been designed to interrogate transponders of other aircrafts, sometimes referred to as intruder aircraft. The TCAS system evaluates the threat of collision with the other aircraft and coordinates an avoidance maneuver for the aircraft. Another type of traffic information system is known as automatic dependent surveillance broadcast (ADS-B). ADS-B systems are capable of providing position, velocity, and status information broadcast from an aircraft at regular intervals using information obtained from global positioning system (GPS) satellites and onboard systems. ADS-B systems may use the Mode S transponders and provide transmissions at regular intervals. Accordingly, ADS-B transponders need not be interrogated.

In an ADS-B system, a Mode S transponder or a squitter may be disposed in a first aircraft that continuously emits a squitter message. The squitter is a radio frequency (RF) signal that is generated by the radio-based transponder. In an ADS-B system since there is no reply to the ADS-B squitter message, it may be desirable to have knowledge of whether the ADS-B squitter is transmitting properly.

Accordingly, there is a need for a system in which an ADS-B squitter message may be checked by the systems of the transmitting aircraft. Further, it may be desirable to have an ADS-B system which not only determines whether the ADS-B squitter is transmitting but also whether the ADS-B message transmitted is correct.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is a vehicle. The vehicle comprises a first transponder circuit on board the vehicle that generates an over-the-air transmission signal and a reference signal. The vehicle also comprises a receiver circuit on board the vehicle receiving the over-the-air transmission signal. Further, the vehicle comprises an integrity-checking circuit receiving an integrity signal from the receiver circuit. The integrity signal is based on the over-the-air transmission signal received by the receiver and the integrity-checking circuit receives the reference signal from the first transponder circuit. The integrity-checking circuit determines the integrity of the over-the-air transmission signal.

What is also provided is a method of determining the integrity of an ADS-B transmission signal. The method comprises attempting to broadcast an ADS-B signal from an aircraft. The method also comprises receiving by receiver on the aircraft the broadcast ADS-B signal if available. Further, the method comprises comparing the received signal with the broadcast signal to determine whether the signal comparison is within a predetermined constraint.

Further, what is provided is a method of handling an ADS-B transmission error. The method comprises broadcasting an ADS-B signal from an aircraft. The method also comprises receiving by a receiver on the aircraft by broadcast ADS-B signal. Further, the method comprises comparing the received signal with the broadcast signal to determine whether the signal comparison is within a predetermined constraint. Further still, the method comprises providing an alert to the pilot of the aircraft of a problem with the ADS-B transmission and terminating the ADS-B transponder transmissions if the problem persists.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
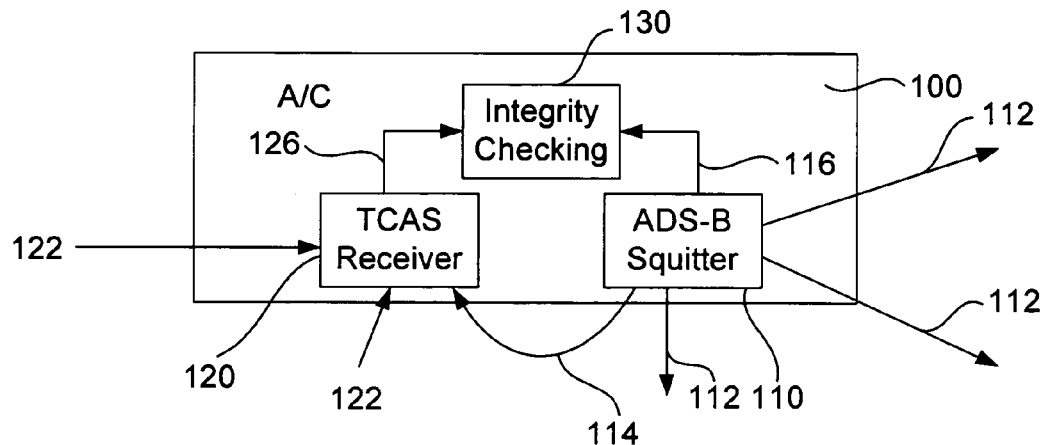
FIG. 1 is an exemplary block diagram of an aircraft having an integrity checking system with an ADS-B squitter and TCAS receiver on board the aircraft.

Before describing in detail the particular improved system and method, it should be observed that the invention includes, but is not limited to a novel structural combination of conventional data/signal processing elements and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with the structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, an aircraft 100 is depicted. Aircraft 100 may be any of a variety of aircrafts including but not limited to airplanes and helicopters. Aircraft 100 may have onboard an ADS-B transponder or squitter 110, a TCAS receiver 120 and an integrity checking system 130. ADS-B squitter 110 may include an antenna, a radio frequency transmission circuit, and other signal processing equipment. ADS-B squitter receives information from a plurality of onboard aircraft systems. Aircraft 100 may also carry TCAS receiver 120 which receives information from other broadcasting aircraft. TCAS receiver 120 may be coupled to a plurality of aircraft systems which are alerting and command systems. It also may be coupled to a TCAS transmission circuit for interrogating other TCAS transponders. In an exemplary embodiment, ADS-B squitter 110 may broadcast to a plurality of aircraft in the local area of aircraft 100 depicted by arrows 112. Further, TCAS receiver 120 may receive a plurality of incoming signals as indicated by arrows 122. TCAS receiver 120 may also receive a transmission directly from ADS-B squitter 110 which is transmitted by ADS-B squitter 110 as indicated by arrow 114. The signal received by TCAS receiver 120 from ADS-B squitter 110 may be checked against itself by integrity checking system 130. Integrity checking system 130 receives the signal which was intended to be broadcast by ADS-B squitter 110 via connection 116. TCAS receiver 120 receives broadcast message 114 and communicates the message along connection 126 to integrity checking system 130. Integrity checking system 130 then compares the signals received along connection 116 and 126.

Figure 2:
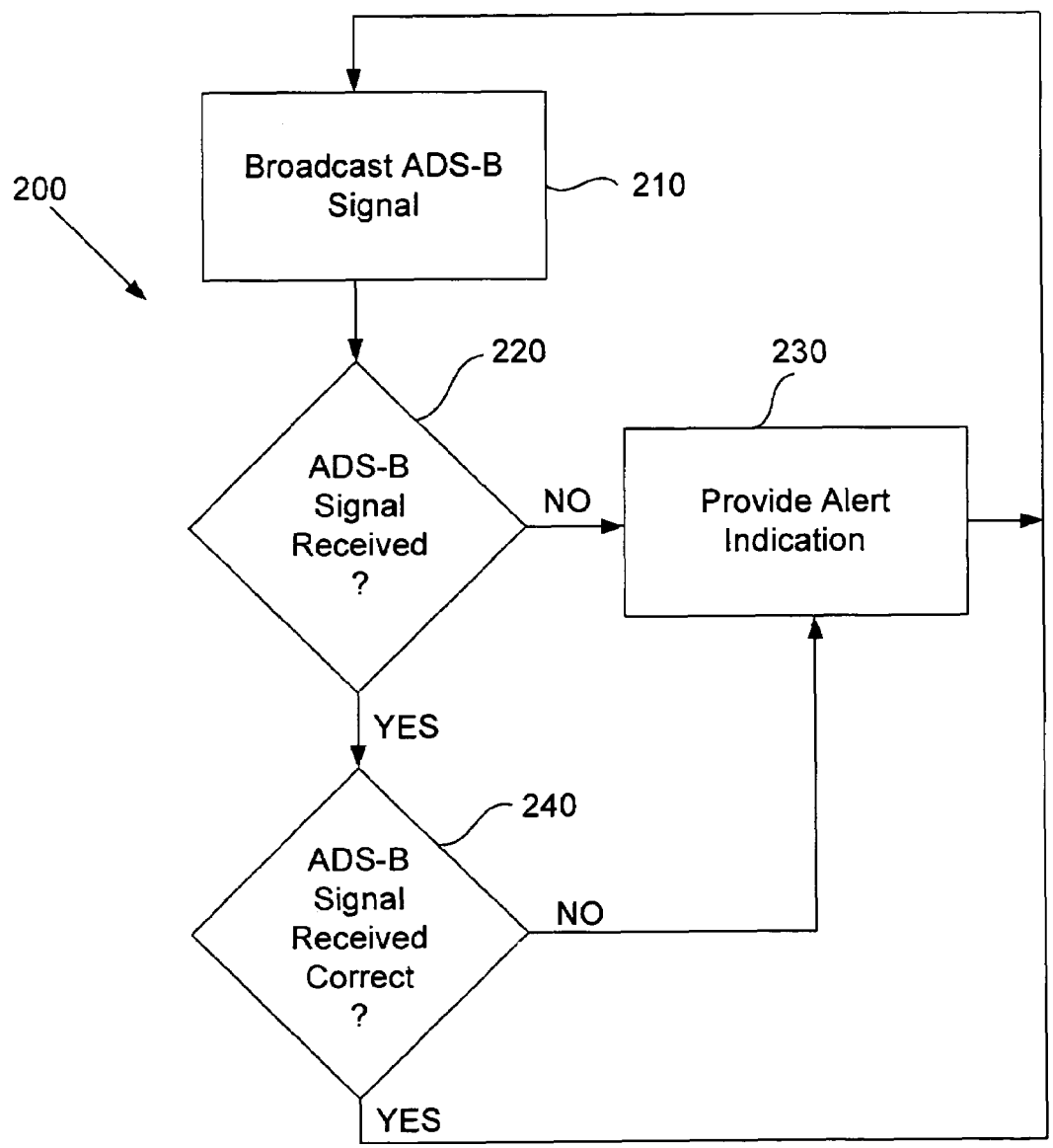
FIG. 2 is an exemplary embodiment of a process for detecting transmission problems with an ADS-B signal.

Referring now to FIG. 2, a process 200 is depicted. Process 200 generally depicts the method in which the signals (received signal and reference signal) are compared. The ADS-B signal is broadcast by ADS-B squitter 110 (step 210). Once the ADS-B signal is broadcast, the ADS-B signal should be received by TCAS receiver 120 and integrity checking system 130 checks if the signal is received (step 220). If the ADS-B signal is not received, an alert indication is provided (step 230). The alert indication may be an internal alert indication which waits for further information or may be an alert indication which is immediately broadcast by a variety of means including, but not limited to visual and aural signals. If the ADS-B signals were received, the ADS-B signal is checked to detect whether the received signal is correct (step 230). If the ADS-B signal is checked against the reference signal and it appears that the ADS-B received signal is not correct, the alert indication is provided (step 230). However, if the ADS-B signal received is correct when compared with the reference signal, then the integrity checking system restarts process 200 and broadcasts another ADS-B signal (step 210).

Figure 3:
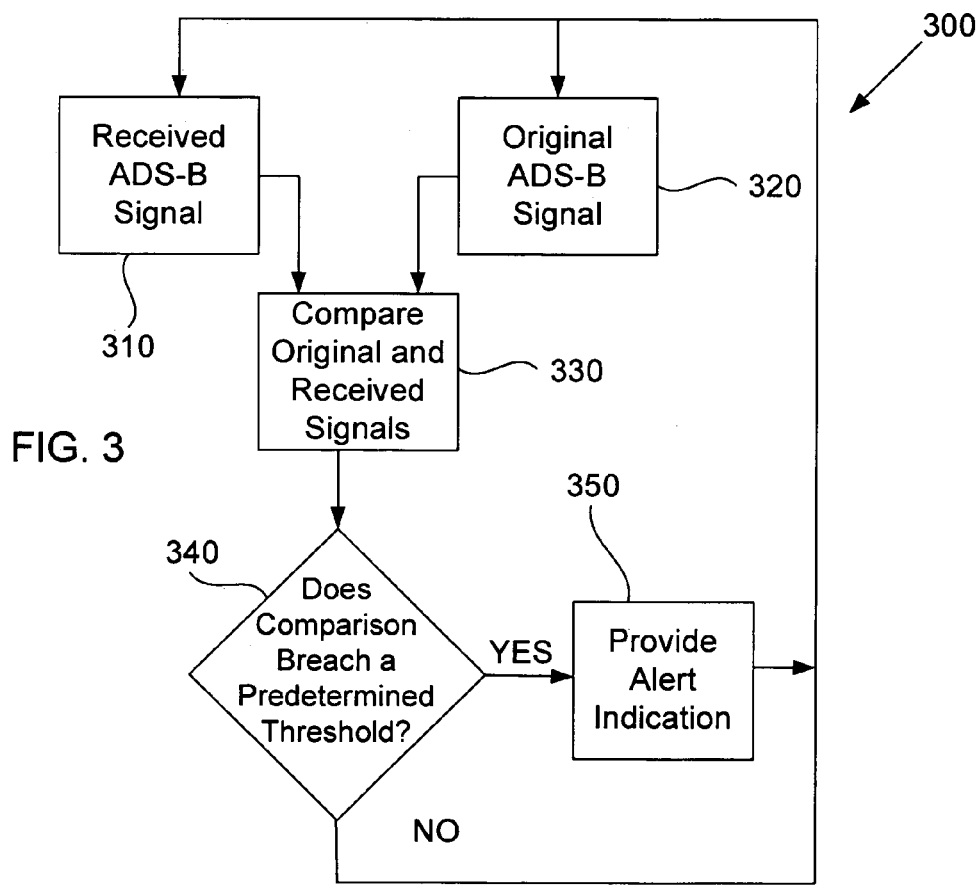
FIG. 3 is another exemplary embodiment of a process which compares a received ADS-B signal and an original ADS-B signal.

Referring now to FIG. 3, an exemplary embodiment of a process 300 is depicted. Process 300 is an exemplary embodiment of a process which compares the original and the received ADS-B signal to determine whether the signal is correct. In process 300, a received ADS-B signal (step 310) and an original ADS-B signal (step 320) are delivered to a comparison circuit 330. The comparison 330 determines or compares the original received signal and a decision is made as to whether the comparison reaches a predetermined threshold (step 340). If the comparison breaches the predetermined threshold, an alert indication is provided (step 350) and the process is restarted. If however the comparison does not breach a predetermined threshold, then the process 300 is repeated without providing any alert. In an exemplary embodiment, there may be a plurality of ways in which the comparison may be carried out including, but not limited to a comparison of the data received by the signal, a differencing, or any of a variety of means in which correlations of received signals with a reference signal are made.

While the detailed drawings, specific examples, and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing and communications devices. For example, the type of computing and communications devices, communications bus, or processor used may differ. The systems and methods depicted and described are not limited to the precise details and conditions disclosed. Furthermore, other substitutions, modifications, changes, and omissions may be made in the design, operating conditions and arrangement of the exemplary embodiments without departing from the scope of the invention as expressed in the appended claims.

What is claimed is:

1. A vehicle comprising:
   a first transponder circuit on board the vehicle generating an over the air transmission signal and a reference signal;
   a receiver circuit on board the vehicle receiving the over the air transmission signal;
   an integrity checking circuit receiving an integrity signal from the receiver circuit, the integrity signal being based on the over the air transmission signal received by the receiver, and the integrity checking circuit receiving the reference signal from the first transponder circuit, the integrity checking circuit determining the integrity of the over the air transmission signal.

2. The vehicle of claim 1, wherein the first transponder circuit comprises a Mode S transponder.

3. The vehicle of claim 1, wherein the first transponder circuit comprises a ADS-B transponder.

4. The vehicle of claim 1, wherein the receiver circuit comprises a TCAS receiver circuit.

5. The vehicle of claim 1, wherein the integrity checking circuit determines whether an over the air signal was received by the receiver circuit.

6. The vehicle of claim 1, wherein the integrity checking circuit provides an alert indication signal if a comparison of the integrity signal and the reference signal breeches breaches a predetermined constraint.

7. The vehicle of claim 1, wherein the vehicle is an aircraft.

8. A method of determining the integrity of an ADS-B transmission signal, comprising:
   attempting to broadcast an ADS-B signal from an aircraft;
   receiving by a receiver on the aircraft the broadcast ADS-B signal if available;
   comparing the received signal with the broadcast signal to determine whether the signal comparison is within a predetermined constraint.

9. The method of claim 8, wherein the receiver comprises a TCAS receiving circuit.

10. The method of claim 8, further comprising:
    determining whether an ADS-B signal was received from the an ADS-B system on the aircraft.

11. The method of claim 8, wherein the aircraft is an airplane.

12. The method of claim 8, further comprising:
    indicating to a pilot of the aircraft that the ADS-B signal is not being transmitted.

13. The method of claim 8, further comprising:
    indicating to a pilot of the aircraft that the ADS-B signal is not being transmitted correctly.

14. The method of claim 8, further comprising:
    indicating to a ground control that a problem with the an ADS-B transponder exists for the aircraft.

15. The method of claim 8, wherein the ADS-B signal is transmitted by a Mode S transponder.

16. A method of handling an ADS-B transmission error, comprising:
- broadcasting an ADS-B signal from an aircraft;
- receiving by a receiver on the aircraft the broadcast ADS-B signal;
- comparing the received signal with the broadcast signal to determine whether the signal comparison is within a predetermined constraint;
- providing an alert to the pilot of the aircraft of a problem with the ADS-B transmission; and
- terminating the ADS-B transponder transmissions broadcast if the problem persists.

17. The method of claim 16, wherein the receiver comprises a TCAS receiving circuit.

18. The method of claim 16, wherein the aircraft is an airplane.

19. The method of claim 16, further comprising:
- indicating to a pilot of the aircraft that the ADS-B signal is not being transmitted correctly.

20. The method of claim 16, further comprising:
- indicating to a pilot of the aircraft that a TCAS system is actively being used and an ADS-B system is not functioning.

* * * * *